(12) United States Patent
Zeren et al.

(10) Patent No.: US 9,981,368 B2
(45) Date of Patent: May 29, 2018

(54) SUSPENSION BUSHING SERVICE TOOL AND METHOD OF USE

(71) Applicants: Erol Zeren, Eden Prairie, MN (US); Stanley R. Norland, Blooming Prairie, MN (US)

(72) Inventors: Erol Zeren, Eden Prairie, MN (US); Stanley R. Norland, Blooming Prairie, MN (US)

(73) Assignees: Bosch Automotive Service Solutions Inc., Warren, MI (US); Robert Bosch Gmbh, Stuttgart (DE)

( * ) Notice: Subject to any disclaimer, the term of this patent is extended or adjusted under 35 U.S.C. 154(b) by 290 days.

(21) Appl. No.: 14/879,384

(22) Filed: Oct. 9, 2015

(65) Prior Publication Data

US 2017/0100825 A1     Apr. 13, 2017

(51) Int. Cl.
   *B23P 11/00*      (2006.01)
   *B25B 27/28*      (2006.01)
   *B23P 19/027*     (2006.01)

(52) U.S. Cl.
   CPC ............ *B25B 27/28* (2013.01); *B23P 19/027* (2013.01)

(58) Field of Classification Search
   CPC ....... B23P 19/027; B23P 11/00; B23P 11/028; B23P 19/006; B23P 19/04; B25B 27/28
   See application file for complete search history.

(56) References Cited

U.S. PATENT DOCUMENTS

| | | | | |
|---|---|---|---|---|
| 4,503,595 A | * | 3/1985 | Sheill | B23P 11/00 29/434 |
| 7,818,860 B2 | | 10/2010 | Hume et al. | |
| 2011/0296893 A1 | * | 12/2011 | Breen | B21D 37/12 72/343 |
| 2012/0266428 A1 | * | 10/2012 | Hodges | B25B 5/068 29/239 |
| 2013/0074306 A1 | * | 3/2013 | Muenchrath | B25B 27/28 29/426.5 |
| 2017/0100825 A1 | * | 4/2017 | Zeren | B25B 27/28 |

OTHER PUBLICATIONS

OTC Tools, "Rear Suspension Bushing Remover/Installer", May 20, 2013.

* cited by examiner

*Primary Examiner* — Lee D Wilson
(74) *Attorney, Agent, or Firm* — Maginot Moore & Beck LLP

(57) ABSTRACT

A bushing service tool kit includes a clamping plate, head plate, and a mounting plate for a hydraulic cylinder, as well as a clamping member. An alignment member is mounted on one side of a bushing that is mounted in a bushing mount and that is to be replaced, and the clamping plate is mounted over the alignment member. The head plate is mounted on an opposite side of the bushing, and the clamping member clamps the head plate and clamping plate toward each other to clamp the bushing mount therebetween. The mounting plate, with a hydraulic cylinder mounted thereon, is mounted on the clamping member facing toward the clamping plate, whereby the hydraulic cylinder is aligned with the bushing. The cylinder can then be operated to remove the bushing and install a replacement.

19 Claims, 14 Drawing Sheets

SUSPENSION BUSHING SERVICE TOOL AND METHOD OF USE

TECHNICAL FIELD

This disclosure relates generally to mechanical tools, and, in particular, to bushing service tools.

BACKGROUND

Suspensions for heavy vehicles, including trucks and trailers, are typically supported with leaf springs and beam suspensions, which are positioned between an axle or axle assembly and a load carrying frame. Beams and leaf springs generally terminate at each end with a circular eyelet. A bushing is inserted in each eyelet, and allows the beam or leaf spring to be mounted on a hanger or other mounting structure secured to the frame in order to mount the beam or spring on the frame.

Over time, the bushings are generally subject to wear, rust, and other environmental and mechanical stresses. In order to maintain the integrity of the vehicle, the bushings should be replaced as needed. Bushings generally have an extremely tight fit with the eyelets of the beam or leaf spring, which increases the amount of force needed to remove an old bushing and install a replacement.

One known method of servicing bushings includes disassembling the suspension in order to remove the beams or leaf springs from the vehicle, and using a hydraulic press in order to remove old bushings and install replacements. However, disassembling the suspension is costly, time consuming, mechanically intensive, and complex. Additionally, a hydraulic press large enough to support a beam or leaf spring during operation is generally expensive and complex.

Portable hydraulic bushing service tools have been developed. In one example illustrated in FIG. 1, the rear suspension bushing tool, part 4244, produced by Bosch Automotive Service Solutions, includes a first plate 1 connected to a second plate 3 via rods 2. The second plate 3 is configured to support a hydraulic cylinder 4. To operate the tool, a user positions the tool so that an inner side of the first plate 1 is positioned against a rear side of a spring or suspension beam in a region of a bushing to be serviced. While holding the tool in place, the user positions an adapter 6 between the first plate 1 and second plate 3 and then extends the hydraulic cylinder 4 until the adapter 6 is held in place between the bushing and the hydraulic cylinder 4 as illustrated in FIG. 2. Once the adapter 6 is held in place, the user can check if the tool adapter is aligned with the bushing. If the adapter 6 and cylinder 4 are not properly aligned, the user can retract the cylinder 4, and realign the cylinder 4 and adapter 6. Because the tool is not supported when the cylinder 4 is retracted, realigning the cylinder 4 and adapter 6 generally requires the user to physically support the tool. Once aligned, the cylinder 4 can then be operated to push the bushing out from the spring via the adapter 6.

To install a replacement bushing with the tool, the cylinder 4 is disengaged, and the tool is repositioned with the first plate 1 against the rear side of the beam. While holding the tool in place, the user then holds both the adapter 7 and the new bushing between the beam and the cylinder 4. The cylinder 4 is then actuated until the adapter 7 and bushing are held in place between the spring (and the cylinder 4. As above, the user can then check whether the adapter 7, cylinder 4, and bushing are aligned with the hole in the beam, and if necessary can retract the cylinder 4 to correct the alignment. Once aligned, the cylinder 4 can be operated to install the bushing in the hole.

While service tools of the type described above are portable, and are usable with a hydraulic cylinder rather than a full hydraulic press, operating such tools generally requires a user to hold the tool in place until the cylinder is at least partially engaged, and generally require manual alignment of one or more components.

The rear suspension bushing tool, part 4244 described above weighs approximately 67 lbs. Because the user must support the tool during placement and alignment, the servicing of a bushing with such a tool may be physically intensive. Since bushing servicing may be conducted multiple times per vehicle and for multiple vehicles in a day, the physical exertion needed to place and align the tool may limit its functional use. The need for the user to support the components of the tool may also limit the size of the cylinder that can be supported by a user and thus that can be used with the tool. For example, the cylinder 4 may only be able to generate approximately 15 tons of axial force, which may not be sufficient to service all types of bushings. Additionally, in the tool described above, the first plate 1 and second plate 3 are at a fixed distance from each other, and thus the tool is only usable to service springs that are sized to fit with the tool.

Therefore, what is needed is a portable bushing service tool that does not need to be held in place, that does not require manual alignment, and that is usable with a wide variety of beams and springs.

SUMMARY

In order to facilitate servicing various types of bushing installed in various types of bushing mounts, such as eyelets in leaf springs or suspension beams, a bushing service tool includes a clamping plate, an alignment member, a head plate, at least one clamping member, and a mounting plate for a hydraulic cylinder.

The alignment member is mounted on a first side of a first bushing to be removed from a bushing mount. The clamping plate includes an axial hole, and is mounted to the first side of the bushing mount by disposing the axial hole over the alignment member such that the clamping plate is aligned with the bushing.

A pair of rods is passed through longitudinal holes in the clamping plate, and a head plate is mounted to an opposite side of the bushing mount by disposing longitudinal holes in the head plate over the rods. The head plate has an axial hole that is aligned with the axial hole of the clamping plate when the longitudinal holes of the head plate are disposed over the rods.

A pair of fasteners is mounted on an external thread located on a portion of the pair of rods extending away from the clamping plate. The fasteners are tightened toward the clamping plate which causes the clamping plate and head plate to move toward each other and clamp the bushing mount therebetween. Since the fasteners tighten down the clamping plate to toward the head plate until the bushing mount is clamped therebetween, a variety of bushing mounts can be accommodated by the kit by tightening the fasteners accordingly.

The alignment member is removed from the first side of the bushing in order to allow access to the bushing via the axial hole in the clamping plate.

A hydraulic cylinder is mounted in an axial hole of the mounting plate, and the mounting plate is mounted on the rods with the cylinder aligned with and oriented toward the bushing by disposing longitudinal holes in the mounting plate on the rods such that the clamping plate is between the mounting plate and the bushing. The cylinder can then be operated to push the bushing out from the opposite side of the bushing mount, and install a new bushing therein.

This summary is intended only to introduce subject matter pertaining to a bushing service tool which is discussed in more detail in the detailed description, the drawings, and the claims, and is not intended to limit the scope of this disclosure in any way.

BRIEF DESCRIPTION OF THE DRAWINGS

The foregoing aspects and other features of the present disclosure are explained in the following description, taken in connection with the accompanying drawings.

DETAILED DESCRIPTION

Figure 1:
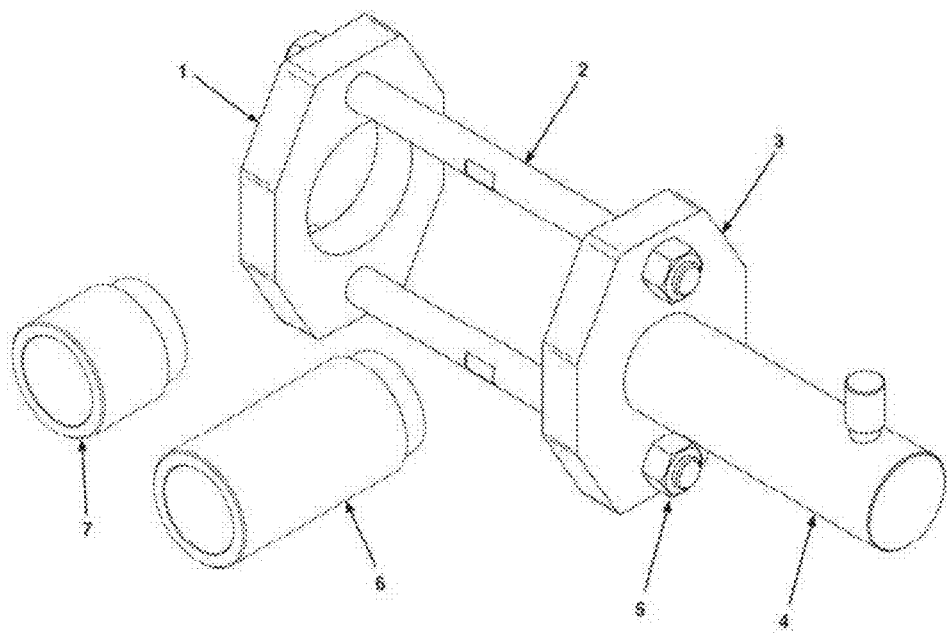
FIG. 1 is a perspective view of a known tool that is usable for removing and installing bushings.
Figure 2:
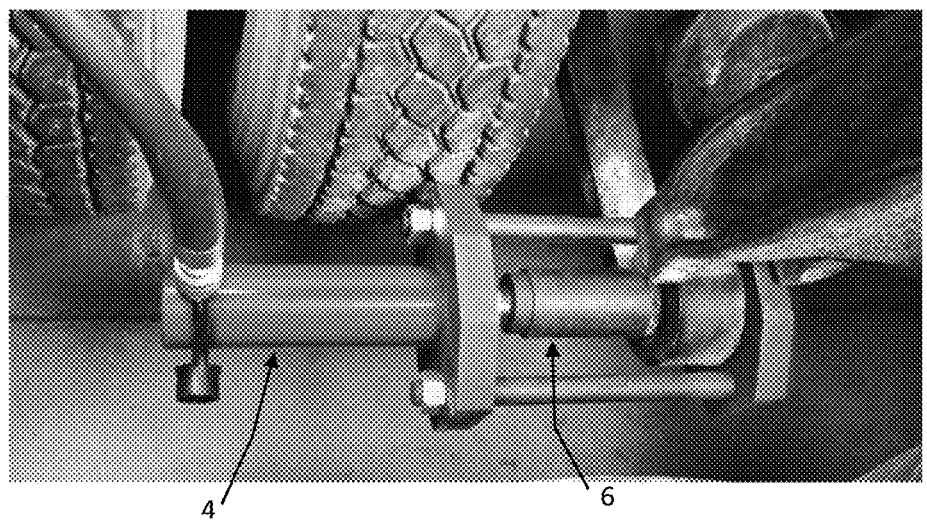
FIG. 2 is an image of the known bushing installer/remover tool of FIG. 1 in use for removing a bushing.

For a general understanding of the present embodiments, reference is made to the drawings. In the drawings, like reference numerals have been used throughout to designate like elements.

Figure 3A:
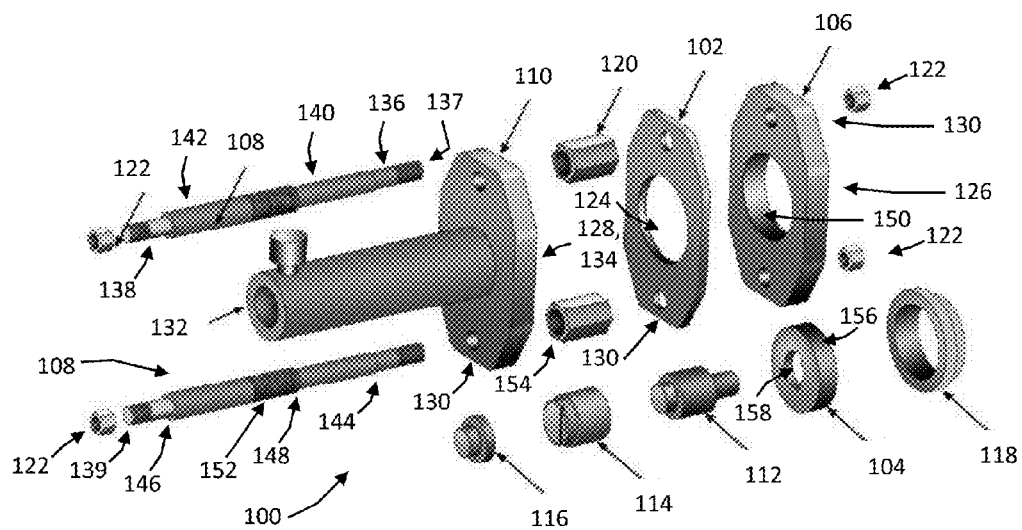
FIG. 3A is a perspective view of a bushing installer/remover kit according to this disclosure.

FIG. 3A illustrates a bushing service kit 100 according to this disclosure. The kit 100 includes a first plate that acts as a clamping plate 102, a first member configured as an alignment member 104, a second plate that is a head plate 106, a pair of second members that are rods 108, a third plate configured as a cylinder mounting plate 110, a third member that is an adapter pin 112, a fourth member configured as a D-Pin adapter 114, a fifth member that acts as a saddle 116, a sixth member that is a bushing support member 118, a pair of fasteners 120, and a plurality of hex nuts 122. The kit 100 further includes a hydraulic cylinder 132, but in other embodiments, the hydraulic cylinder may be provided separately.

Each plate 102, 106, and 110 defines an axial hole 124, 126, and 128 respectively, and further respectively defines additional holes 130. In this embodiment, each plate 102, 106, and 110 has a pair of holes 130 that are symmetrically located on opposite sides of the axial hole 124, 126, and 128 respectively to each receive a respective one of the rods 108, but other configurations are also contemplated. The axial holes 124 and 126 in the clamping plate 102 and head plate 106 are sized to enable a bushing to pass therethrough. In this embodiment, the axial holes 124 and 126 have a circular shape, but other shapes are also contemplated.

The axial hole 128 in the cylinder mounting plate 110 is configured to receive the hydraulic cylinder 132 such that an operative end 134 of the hydraulic cylinder 132 is oriented axially with respect to the axial hole 128. In this embodiment, the axial hole 128 is internally threaded (not shown) in order to mount an external threading (not shown) of the hydraulic cylinder 132, but other acceptable mounting configurations are also contemplated.

The kit 100 includes one rod 108 for each hole 130 on each of the plates 102, 106, and 110. In this embodiment, each plate 102, 106, and 110 includes two holes 130, and thus this embodiment includes two rods 108. Each rod 108 includes a first portion 136 for mounting to the head plate 106, a second portion 138 for mounting to the cylinder mounting plate 110, a third portion 140 between the first portion 136 and second portion 138 for mounting to the clamping plate 102, and a fourth portion 142 between the second portion 138 and the third portion 140.

In this embodiment, each rod 108 is a stepped rod. The first portion 136 includes one end 137 of the rod 108 and is delimited by a first step 144. The second portion 138 includes an opposite end 139 of the rod 108 and is delimited by a second step 146 that acts as a stop so as to keep the mounting plate 110 spaced apart from the clamping plate 102 in order to provide room for the cylinder 132 to operate. The first portion 136 and second portion 138 are configured to receive hex nuts 122.

Starting from the first end 137, the first step 144 delimits the first portion 136 and widens a diameter of the rod 108 along the third portion 140 to a size configured to slidingly fit within the holes 130. A third step 148 further widens the diameter of the rod 108 along the fourth portion 142 to a size greater than the diameter of the holes 130 such that the third step 148 limits an extent to which a hole 130 in the first plate can be received on the rod 108. The fourth portion 142 extends from the third step 148 to the second step 146 that decreases the diameter of the rod 108 back to the second portion 138.

The kit includes one fastener 120 for each rod 108, and thus in this embodiment includes two fasteners 120. The fourth portion 142 includes an external thread 152 that extends from the third step 148 over at least a portion of the length of the fourth portion 142. The fasteners 120 define an axial hole 154 with an internal thread configured to allow each fastener 120 to be received on the external thread 152 of the rods 108, whereby the external thread 152 is configured such that the fastener 120 can be tightened toward the third portion 140 when mounted on the external thread 152.

The alignment member 104 has an outer surface 156 that is complementary to an inner surface 150 of the axial hole 124 of the clamping plate 102. In other words, the outer surface 156 of the alignment member 104 is configured to be received in the axial hole 124 of the first plate with a close running fit. The alignment member 104 additionally defines an axial hole 158. In an embodiment, the axial hole 126 of the head plate 106 is also sized to correspond to the outer surface 156 of the alignment member 104.

Figure 3B:
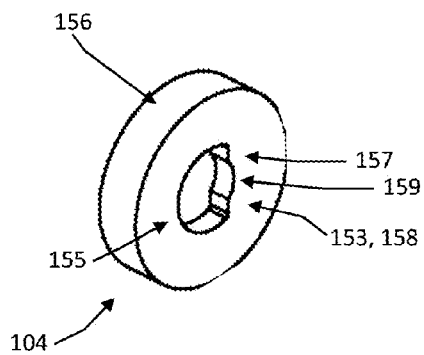
FIG. 3B is a detail view of an alignment member of the kit illustrated in FIG. 3A.

FIG. 3B illustrates a detail drawing of the alignment member 104, which, when mounted in a bushing, provides an aligned mounting point for the clamping plate 102. A cross section 153 of the axial hole 158 includes a semicircular portion 155 and a straight portion 157 that together form a "D" shape. The straight portion 157 includes a further semicircular portion 159 facing away from and having a smaller radius than the semicircular portion 155. With this configuration, the cross section 153 of the axial hole is configured to receive at least a portion of a D-Pin bushing by engaging the semicircular portion 155 and the straight portion 157, and is also configured to receive a substantially cylindrical member, such as an axial protrusion 160 of the adapter pin 112 (FIG. 3C) described in further detail below, by engaging the semicircular portion 155 and the further semicircular portion 159. When a D-Pin type bushing is received in a bushing mount, the alignment member can be placed over an exposed end so that the D shape of the axial hole 158 engages with the end of the D-Pin bushing. The outer surface 156 thus provides a mounting point for the axial hole 124 of the clamping plate 102 that is aligned with the bushing.

Figure 3C:
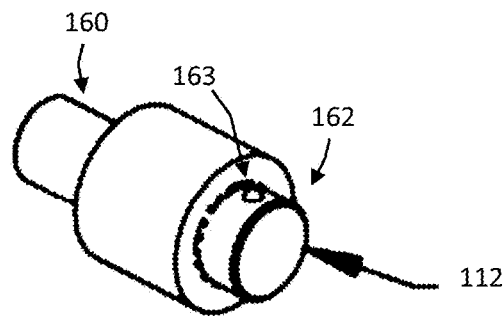
FIG. 3C is a detail view of an adapter pin of the kit illustrated in FIG. 3A.

FIG. 3C illustrates a detail view of the adapter pin 112 from FIG. 3. The adapter pin 112 defines a first axial protrusion 160 that is configured to be received in and at least partially pass through the axial hole 158 of the alignment member 104 (FIG. 3B) by engaging the further semicircular portion 159 of the axial hole 158. The portion that is passed through the axial hole 158 can be inserted into an axial hole in a pivot bushing. Since the alignment member 104 is engaged with the protrusion 160, the alignment member is then aligned with the pivot bushing and provides an aligned mounting point for the clamping plate 102.

The adapter pin 112 further defines a second axial protrusion 162 opposite the first axial protrusion 160 that is configured to be received in the operational end 134 of the hydraulic cylinder 132. In this embodiment, the second axial protrusion 162 includes a mounting member 163, which in this embodiment is a spring-loaded ball 163, for mounting with the operational end 134 of the hydraulic cylinder 132, but other mounting structures are also contemplated.

Figure 3D:
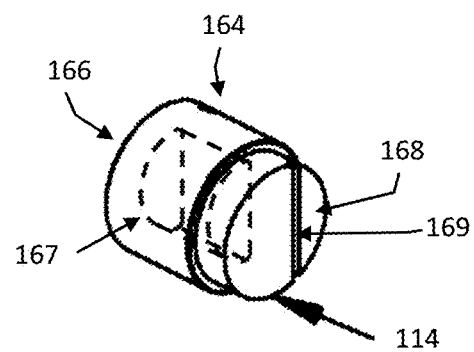
FIG. 3D is a detail view of a D-Pin adapter of the kit illustrated in FIG. 3A.

FIG. 3D is a detail view of the D-Pin adapter 114. The D-Pin adapter 114 includes a first portion 164 that defines an axial recess 166 configured to receive an end portion of a bushing. In this embodiment, the recess 166 has a D-shaped cross-section 167 configured to receive an end portion of a D-pin type bushing. Other types of adapters with differently shaped recesses 166 for receiving other types of bushings are also contemplated. The D-Pin adapter 114 is configured to be able to pass through the axial hole 124 of the clamping plate 102. A surface 168 of the D-Pin adapter 114 facing away from the recess 166 is on a plane normal to the axial direction such that a force acting on the surface 168 acts on the D-Pin adapter 114 along the axial direction. In this embodiment, the surface 168 includes a marker 169 that indicates an orientation of the recess 166. The marker 169 is usable to orient a bushing within the recess 166, and to orient the D-Pin adapter 114 relative to a bushing mount in order to align the bushing with the bushing mount.

Figure 3E:
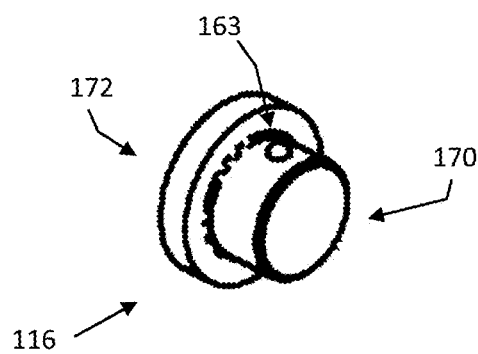
FIG. 3E is a detail view of a saddle of the kit illustrated in FIG. 3A.

FIG. 3E illustrates a detail view of the saddle 116. The saddle 116 includes an axial protrusion 170 configured to be received in the operational end 134 of the hydraulic cylinder 132. In this embodiment, the protrusion 170 also includes a mounting nub 163 for the operational end 134 of the cylinder 132. A surface 172 of the saddle 116 opposite the axial protrusion 170 is on a plane normal to the axial direction such that when the surface 172 bears against an element, the saddle 116 acts on the element along the axial direction.

Figure 3F:
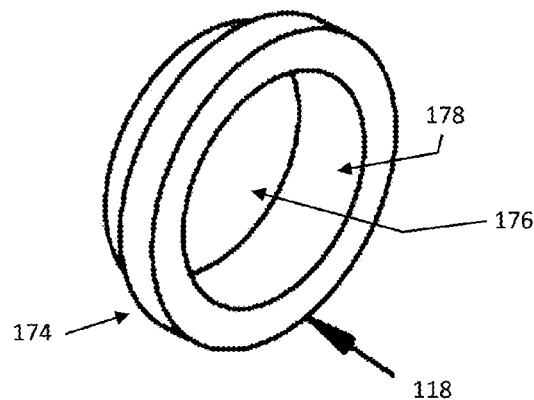
FIG. 3F is a detail view of a bushing support member of the kit illustrated in FIG. 3A.

In some embodiments, a beam with a bushing mount may have insufficient material around the bushing mount to axially support the head plate 106. FIG. 3F illustrates a detail view of the bushing support member 118. The bushing support member 118 defines an annular collar 174 configured to be mounted on the axial hole 126 of the head plate 106, and further defines an axial hole 176 with an inner surface 178. Once mounted between the head plate 106 and the bushing mount, the bushing support member 118 provides axial support for the head plate 106. See, e.g., FIG. 12, discussed in further detail below.

In contrast to conventional bushing service tools, which generally have a rigid frame, and thus are only usable with bushing mounts that fit with the rigid frame, the kit 100 according to this disclosure is assembled onto the bushing mount, and thus is configured to accommodate a wide variety of bushing mounts. Additionally, because the kit 100 is mounted onto the bushing mount, a user need not manually support multiple components during assembly. Further, because the components of the kit 100 are self-locating, additional alignment by the user may be dispensed with.

The following examples describe several exemplary procedures for using the kit 100 for servicing a variety of bushings on a variety of bushing mounts. These examples are exemplary only and are not intended to be limiting in terms of scope of this disclosure. The kit 100 may be used with additional types of bushing and with additional types of bushing mounts, and alternative procedures, such as more or fewer steps, or steps in a different order, may be used to service bushings using the kit 100 as would be understood by one of ordinary skill in the art.

Figure 4:
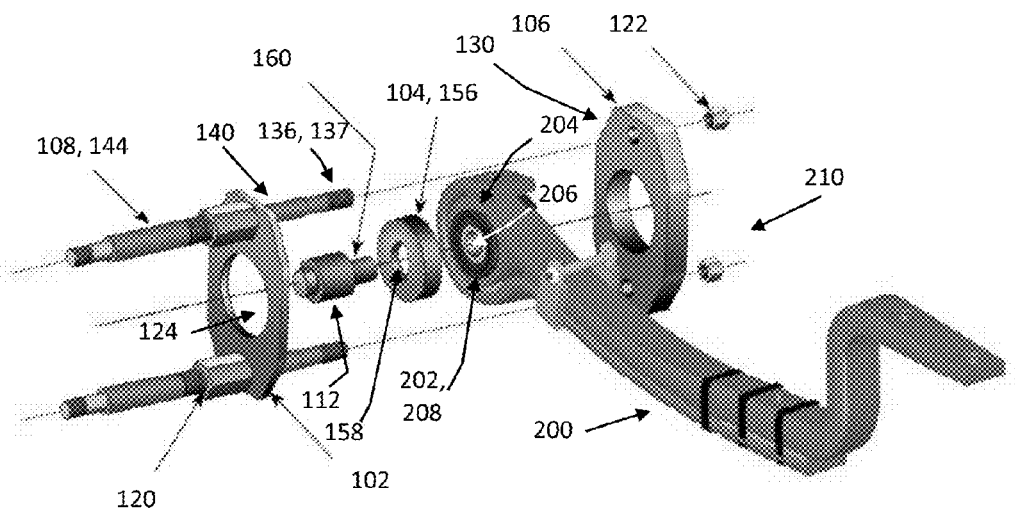
FIGS. 4-7, FIGS. 8-11, FIGS. 12-15, FIG. 16-19, and FIGS. 20-23 respectively illustrate different embodiments of the kit of FIG. 3A in use for replacing different bushings according to this disclosure.

FIG. 4 illustrates an exemplary portion of a suspension system for a vehicle that includes a COMFORT AIR® suspension beam 200 available from Hendrickson. The beam 200 includes an eyelet 202 at one end, and a bushing 204 received therein is to be serviced. The axial protrusion 160 of the adapter pin 112 is passed through the axial hole 158 of the alignment member 104 and inserted into an axial hole 206 in the bushing 204 to hold the alignment member 104 against a first side 208 of the beam 200 so that the alignment member 104 is axially aligned with the bushing 204 and provides an aligned mounting point for the clamping plate 102.

The clamping plate 102 is mounted by positioning the axial hole 124 over the alignment member 104. Since the alignment member 102 is mounted on the beam 200, after the clamping plate 102 is mounted on the alignment member 104, the clamping plate 102 is supported by the alignment member 104, and a user need not support the clamping plate 102 during further assembly.

The fasteners 120 may be any type of acceptable nut such as a clamping nut, and are positioned on the external thread of the fourth portions 144 of the rods 108. The first portions 136 and third portions 140 of the rods 108 are passed through the holes 130 in the clamping plate 102 until the clamping nuts 120 engage the clamping plate 102. Once inserted into the holes 130, the rods 108 are supported by the clamping plate 102.

Figure 5:
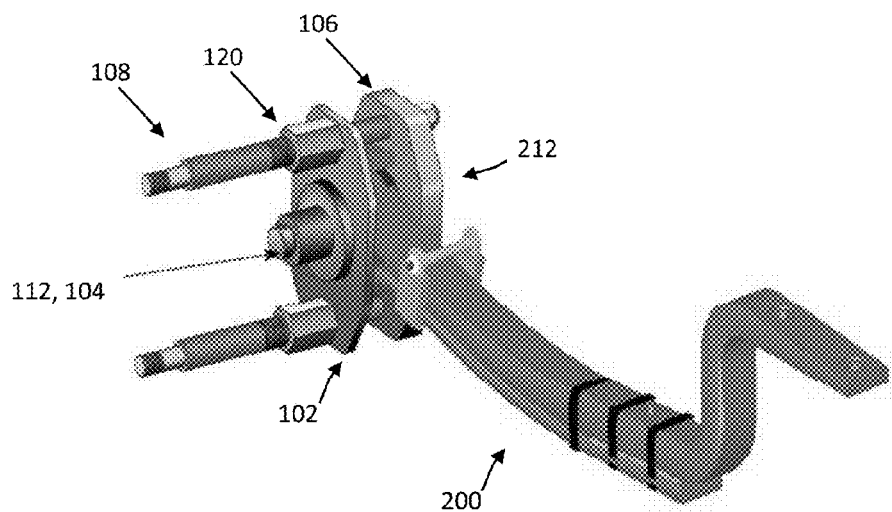

The head plate 106 is mounted on a second side 210 of the beam 200 by positioning the holes 130 in the head plate over the first portions 136 of the rods 108. One nut 122 is placed on the end 137 of each rod to hold the head plate 106 thereon. The clamping nuts 120, can then be tightened, which causes the clamping plate 102 to move toward the head plate 106 and clamp the beam 200 therebetween. This in-progress assembly 212 of the kit 100 is illustrated in FIG. 5.

The clamping plate 102 and head plate 106 are held in alignment with the bushing 204 via the clamping force of the clamping nuts 120. The alignment member 104 and adapter pin 112 can be removed in order to provide access to the bushing 204 without disturbing the location of the clamping plate 102 or head plate 104.

Figure 6:
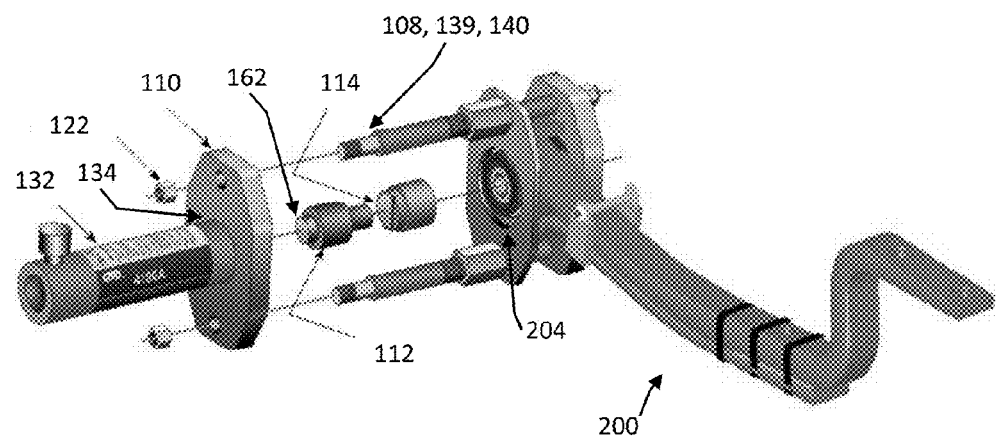

As illustrated in FIG. 6, the hydraulic cylinder 132 is mounted onto the cylinder mounting plate 110. The cylinder mounting plate 110 is installed on the end 139 of the rods 108, with the operational end 134 of the cylinder 132 oriented toward the bushing 204, by passing the third portions 140 of the rods 108 through the holes 130 in the cylinder mounting plate 110. A nut 122 is placed on the end 139 of each rod 108 in order to hold the cylinder mounting plate 110 thereon, and each of the nuts 122 is tightened down. Although not shown in FIG. 6, the cylinder 132 is connected on an end opposite the operational end 134 to a hydraulic circuit for actuating the cylinder 132.

Because the cylinder 132 is mounted onto the mounting plate 110 which is supported on the beam 200, a user need not support the cylinder 132 after it is mounted but before it is operated. In other words, the user only need manually support components of the kit 100 during mounting, rather than until the cylinder is engaged as in conventional service tools. As a result, a larger cylinder 132 can be used. For example, the cylinder 132 may be able to generate approximately 25 tons of axial force relative to the 15 tons of axial force of a conventional service tool.

The second axial protrusion 162 of the adapter pin 112 is inserted into the operational end 134 of the hydraulic cylinder. The D-Pin adapter 114, in this embodiment, is used to provide a flat surface for engaging the bushing 204 during operation of the cylinder 132. The cylinder 132 can be operated to clamp the D-pin adapter 114 between the adapter pin 112 and the bushing 204, whereby the cylinder 132 can be further operated to push the bushing 204, via the adapter pin 112 and D-pin adapter 114, out from the second side 210 of the beam 200.

Figure 7:
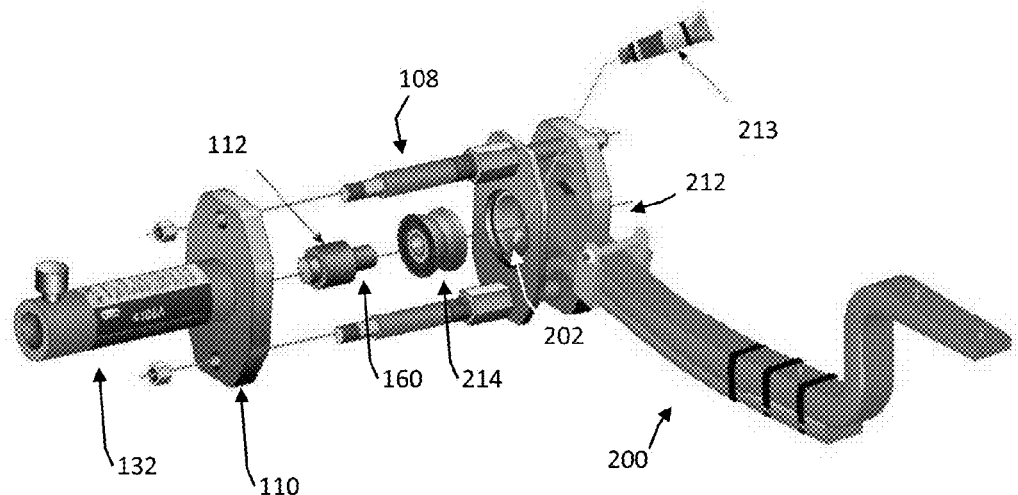

FIG. 7 illustrates the procedure for installing a new bushing 214 in the beam 200. Since the assembly 212 is already mounted on the beam 200, it is not necessary to reposition or remount any components after removing the old bushing 204, and the installation of the new bushing 214 can proceed directly.

The eyelet 202 is advantageously cleaned and lubricated with a lubricant 213 according to any acceptable fashion. The D-pin adapter 114 is removed, and the new bushing 214 is placed onto the axial protrusion 160 of the adapter pin 112. Because the adapter pin 112 is mounted on the cylinder 132, which is mounted on the cylinder mounting plate 110 that is aligned with the eyelet 202 via the rods 108, the new bushing 214 is aligned with the eyelet 202. The cylinder 132 can thus be operated to install the new bushing 214 in the eyelet 202.

The examples that follow include several procedures that are similar to the procedures described above with reference to FIGS. 4-7, where duplicative information has been dispensed with.

Figure 8:
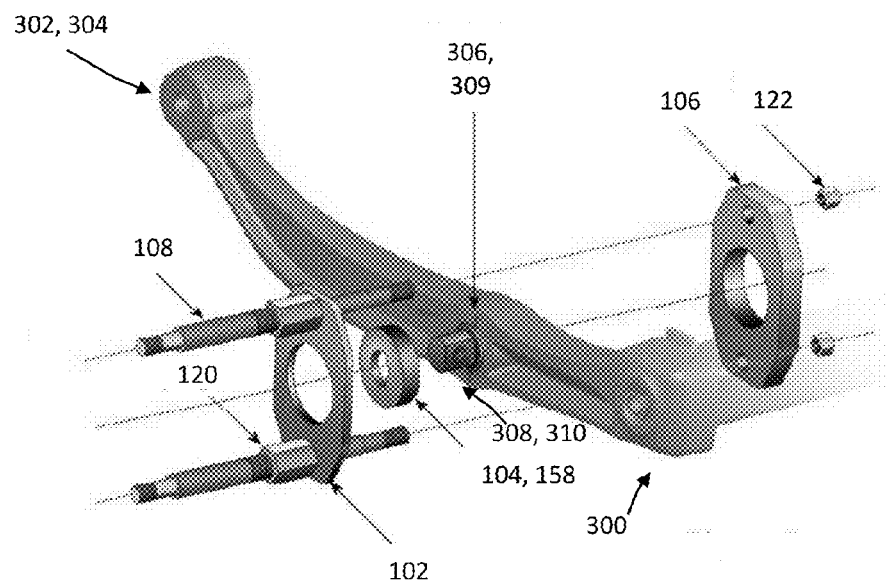

FIG. 8 illustrates a portion of a vehicle suspension that includes a PRIMAXX® EX suspension beam 300 that is available from Hendrickson. In this embodiment, the beam 300 includes a first eyelet 302 with a pivot bushing 304 received therein and a second eyelet 306 with a D-Pin bushing 308 received therein. The D-Pin bushing 308 can be serviced as follows.

Generally, it is advantageous to make a marking 309 on the beam 300 to indicate the current alignment of the D-Pin bushing 308 by any acceptable means. The axial hole 158 of the alignment member 104 is fitted over an exposed portion 310 of the D-Pin bushing 308. Since, in this embodiment, the portion 310 of the D-Pin bushing 308 is protruding from the beam 300, the adapter pin 112 can be dispense with for mounting the alignment member 104.

Figure 9:
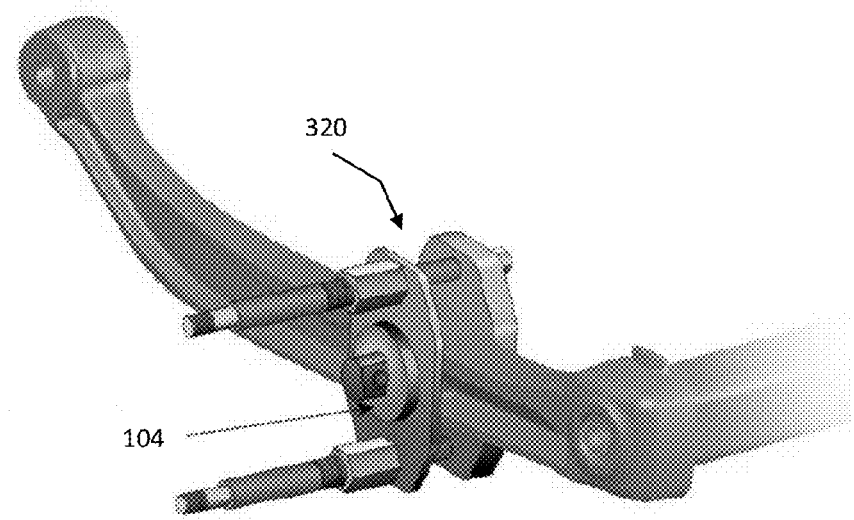
Figure 10:
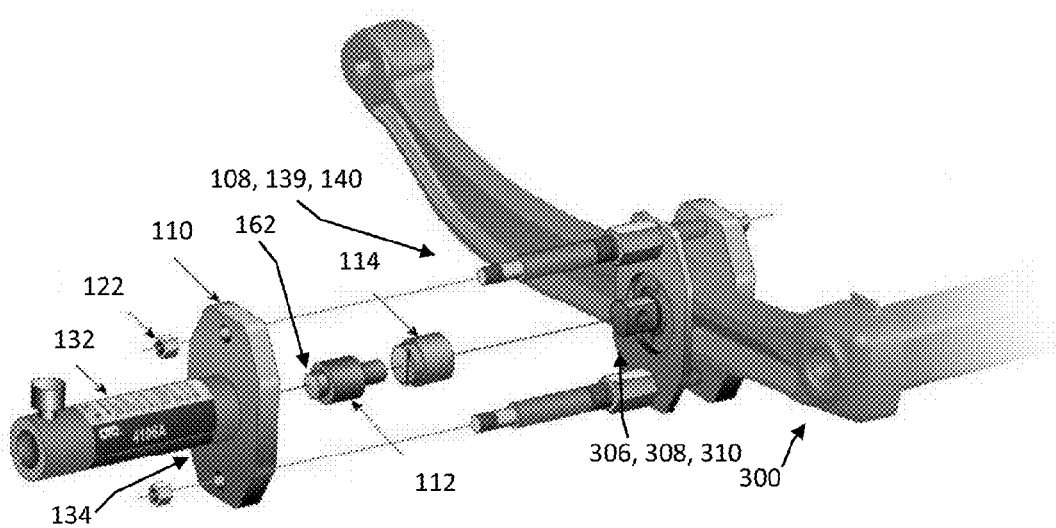

The assembly 320 of the clamping plate 102, rods 108, clamping nuts 120, head plate 106, and nuts 122 can then be installed as illustrated in FIG. 9. The alignment member 104 can then be removed, and the cylinder 132, cylinder mounting plate 110, adapter pin 112, D-Pin adapter 114, and nuts 122 can be installed as in FIG. 10. In this embodiment, rather than providing a flat engagement surface, the D-Pin adapter 114 is used to engage the exposed portion 310 of the D-pin, whereby the exposed portion 310 is received in the complementary recess 166 (FIG. 3D). This ensures that the D-Pin bushing 308 is axially driven by the cylinder 132 without damaging the D-shaped cross section of the bushing 308 or the beam 300. The cylinder 132 can then be operated to push the D-Pin bushing 308 out from the beam 300.

Figure 11:
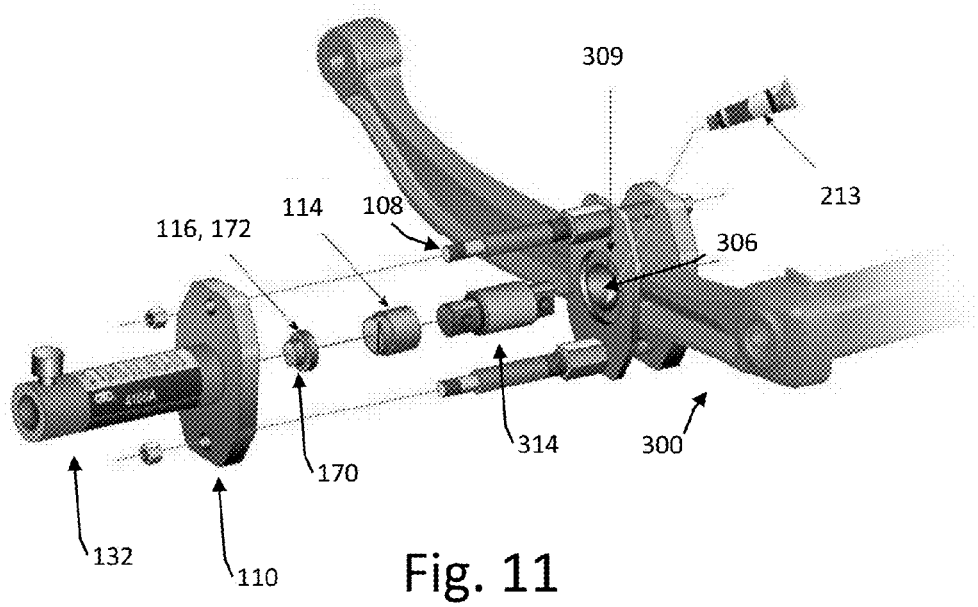

As illustrated in FIG. 11, to install a new D-Pin bushing 314 into the beam 300, instead of installing the adapter pin 112 into the operational end 134 of the cylinder 132, a saddle 116 is used. The axial protrusion 170 is inserted into the operational end 134 of the cylinder 132 so that the opposing end 172 of the saddle 116 forms a flat engagement surface for engaging the D-pin adapter 114. The marker 169 of the D-Pin adapter 114 is aligned with the marking 309, and is installed over the D-Pin bushing 314 so that at least a portion of the D-Pin bushing 314 is received in the recess 166 (FIG. 3D). The cylinder 132 is operated to hold the bushing 314 in place and then install the new bushing 314 in the beam 300.

Figure 12:
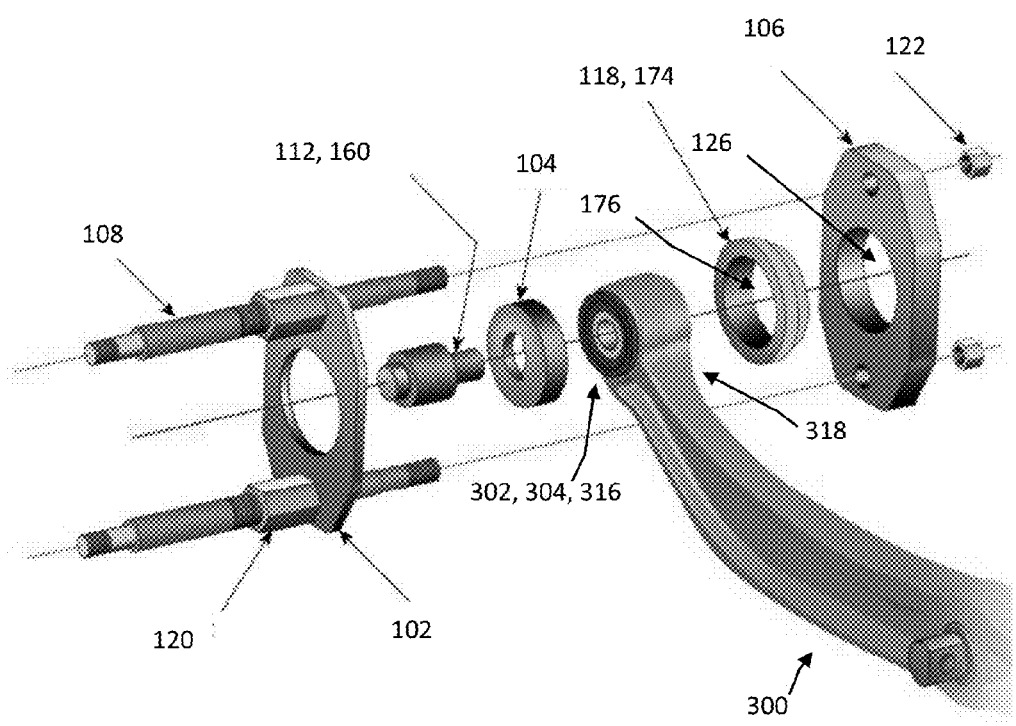
Figure 13:
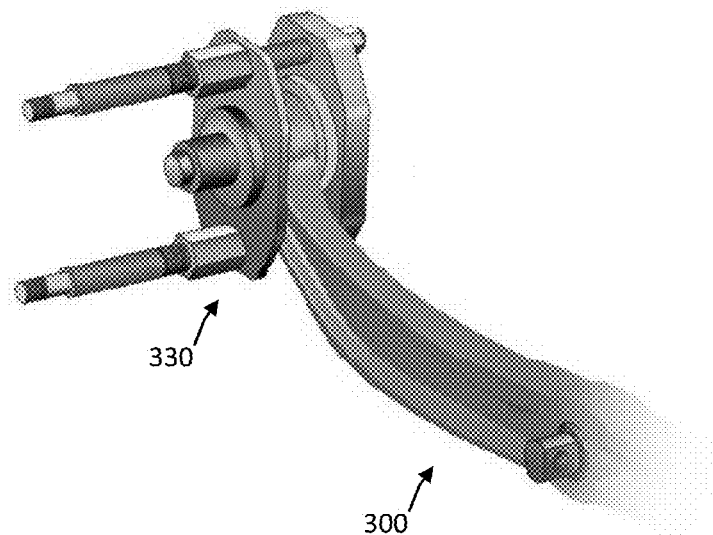

The pivot bushing 304 can be serviced as follows. As illustrated in FIG. 12, the adapter pin 112 and alignment member 104 are installed on the first side 316 of the bushing 304. Additionally, a bushing support member 118 is installed on the opposite side 318 of the bushing 304. The bushing support member 118 is configured to support the bushing 304 as it is pushed out from the beam 300. The axial hole 176 of the bushing support member 118 is disposed over the second side 318 of the bushing 304. Then, the clamping plate 102, head plate 106, rods 108, clamping nuts 120, and nuts 122 can be installed as illustrated in FIG. 12. The axial hole 126 of the head plate 106 is mounted on the annular collar 174 of the bushing support member 118 such that the bushing support member 118 is disposed between the second side 318 of the beam 300 and the head plate 106, as illustrated by the assembly 330 in FIG. 13.

Figure 14:
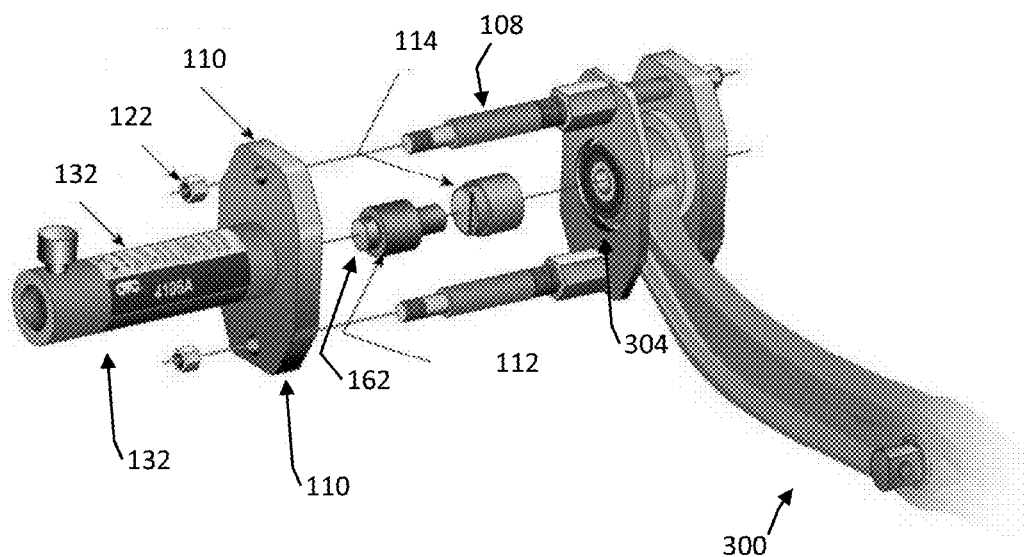
Figure 15:
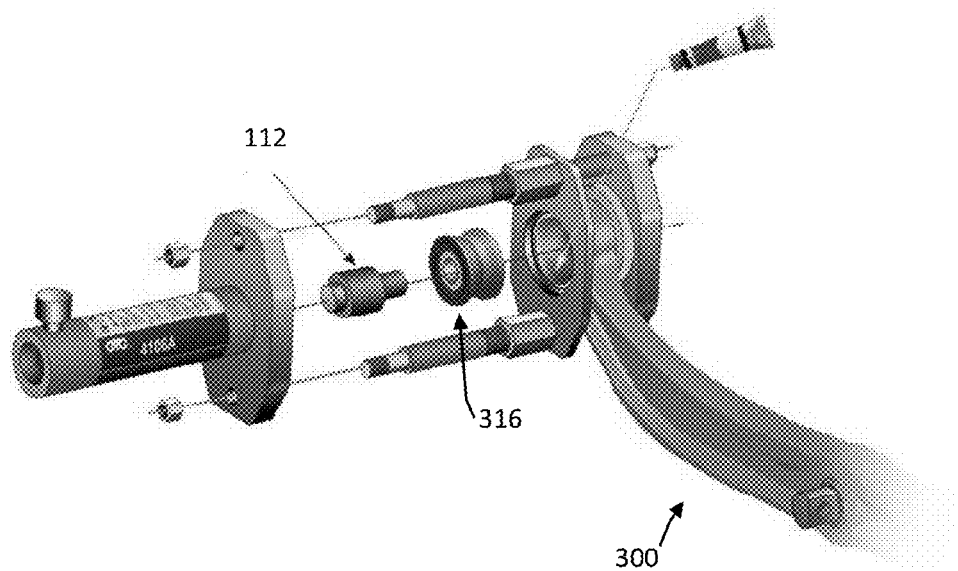

The adapter pin 112 and alignment member 104 can then be removed, and the cylinder 132, cylinder mounting plate 110, adapter pin 112, D-Pin adapter 114, and nuts 122 can be installed as illustrated in FIG. 14. The cylinder 132 can then be operated to push the bushing 304 out from the beam 300. FIG. 15 illustrates the installation of a new pivot bushing 316 in a manner similar to the installation of the bushing 214 in FIG. 7.

Figure 16:
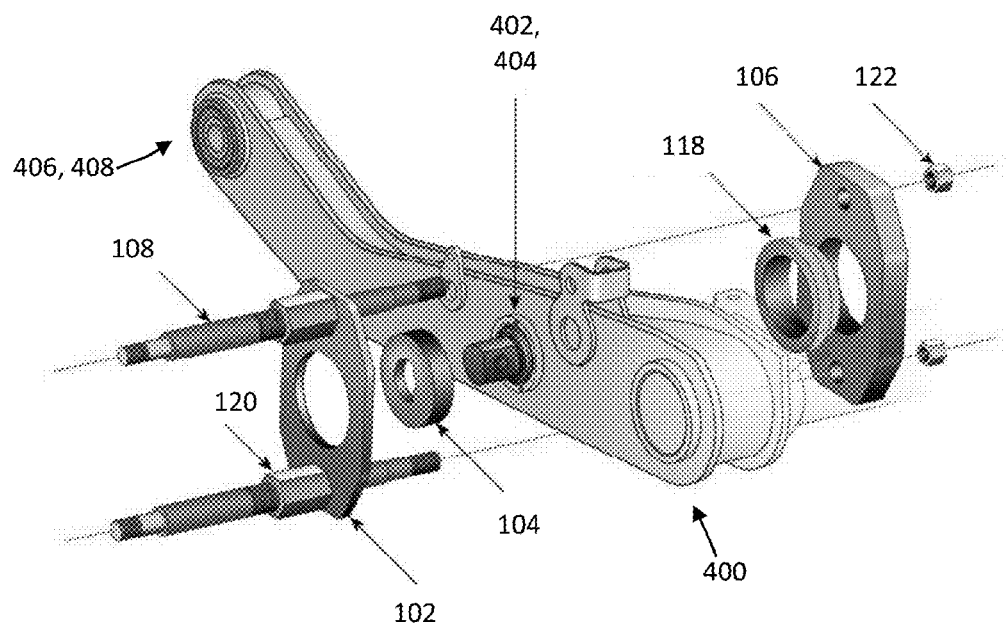

FIG. 16 illustrates a portion of a vehicle suspension that includes a V-RIDE™ suspension beam 400 that is available from Hendrickson, and that includes a first eyelet 402 with a D-Pin Bushing 404 received therein, and a second eyelet 406 with a pivot bushing 408 received therein.

Figure 17:
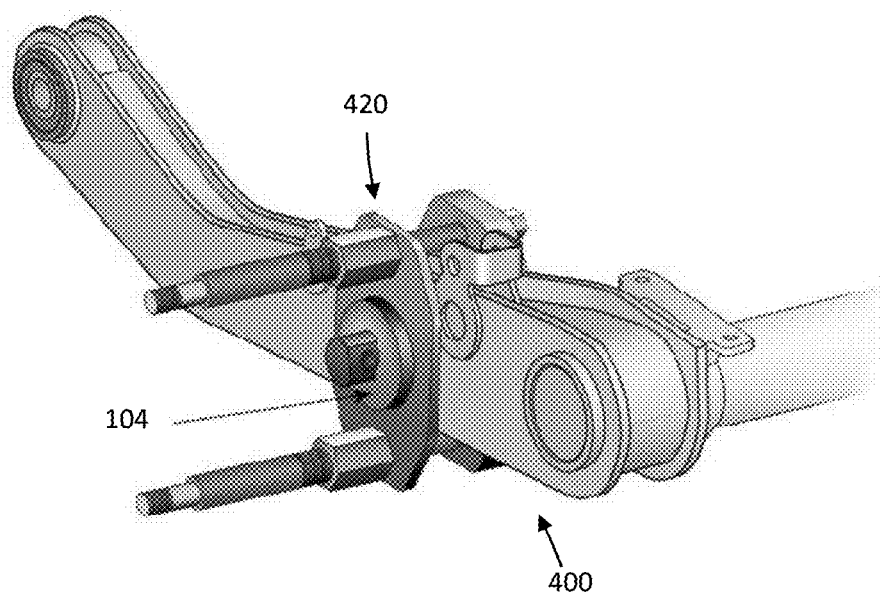

The alignment member 104 is mounted on the exposed portion of the D-Pin bushing 404 in the fashion described with regard to the D-Pin bushing 304 in FIG. 8, and the bushing support member 118 is mounted on a second side 410 of the D-Pin bushing 404. The clamping plate 102, head plate 106, rods 108, clamping nuts 120, and nuts 122 can then be installed as shown in the assembly 420 illustrated in FIG. 17.

Figure 18:
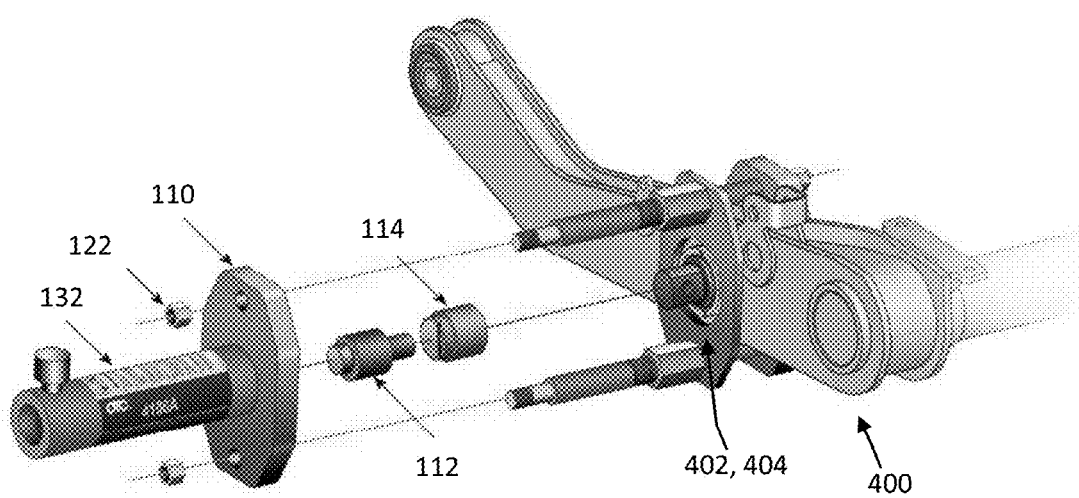
Figure 19:
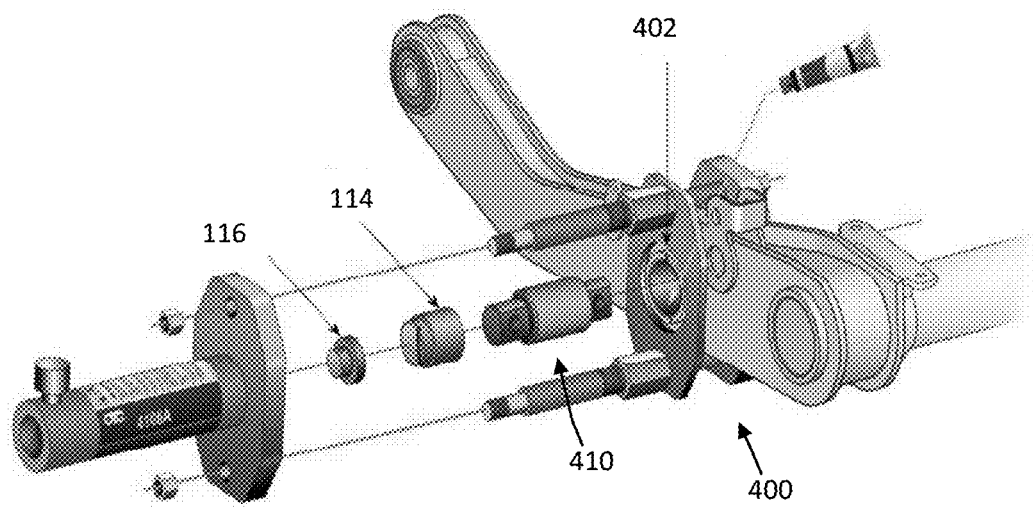
Figure 20:
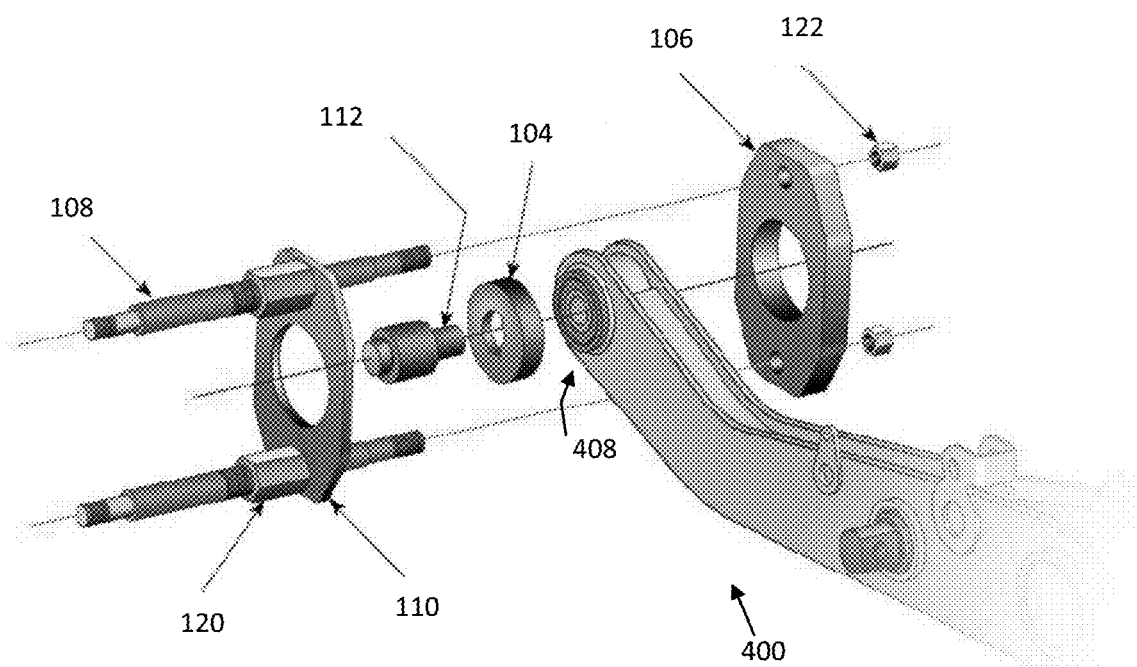
Figure 21:
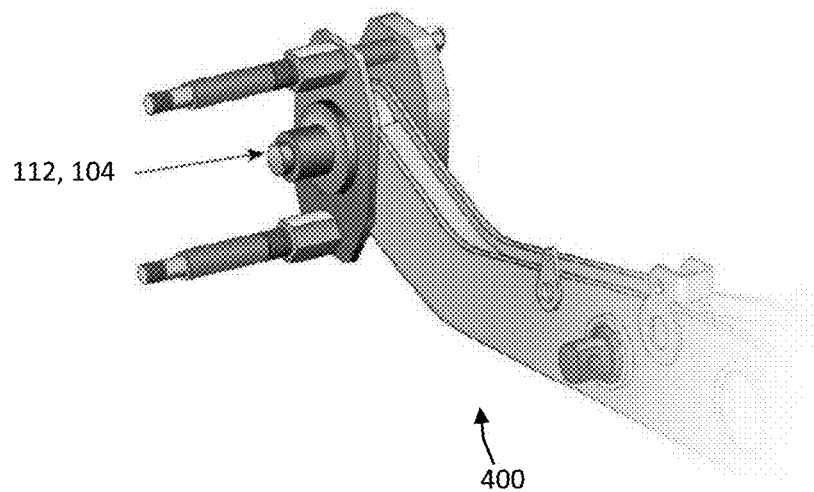
Figure 22:
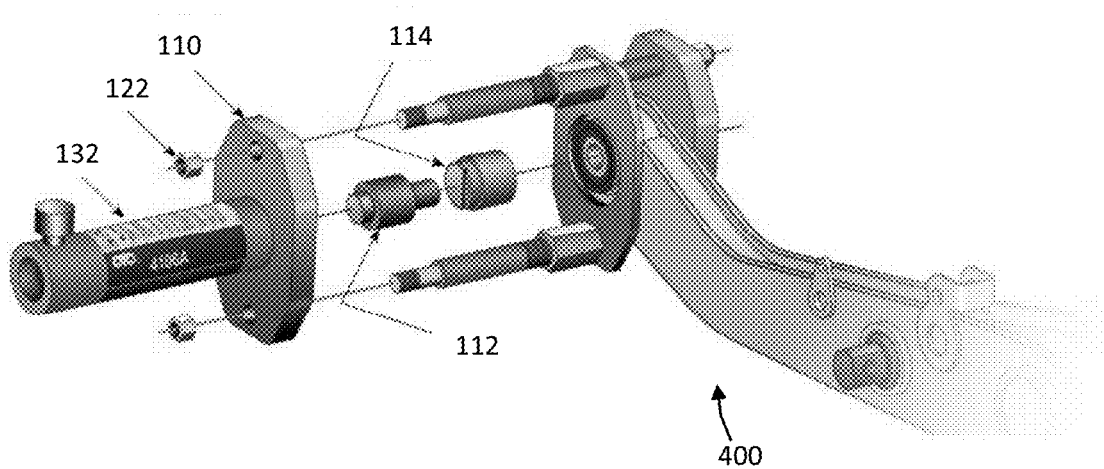
Figure 23:
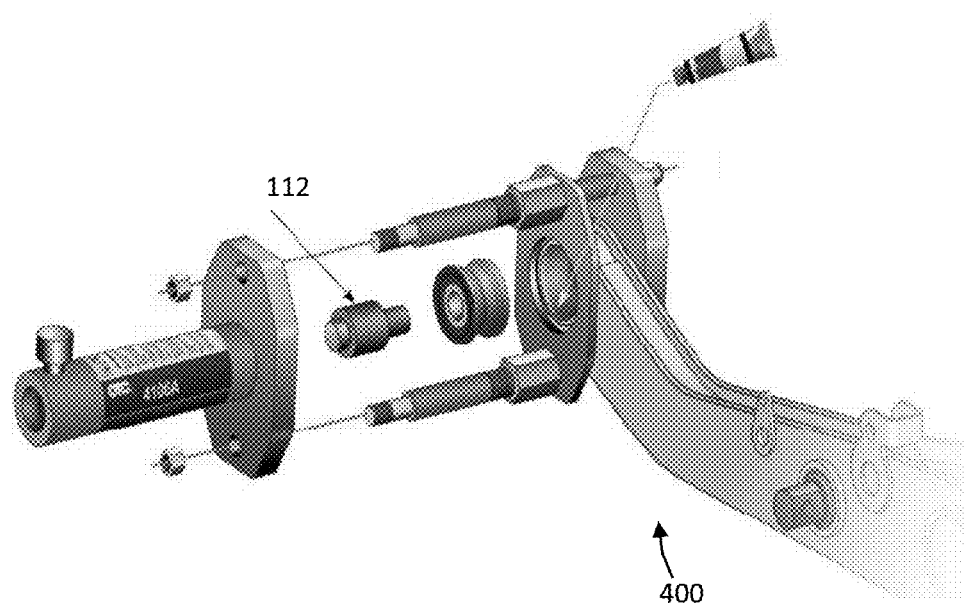

The alignment member 104 can then be removed, and the cylinder 132, cylinder mounting plate 110, adapter pin 112, D-Pin adapter 114, and nuts 122 can be installed as illustrated in FIG. 18. The cylinder 132 can then be operated to push the bushing 404 out from the beam 400. As illustrated in FIG. 19, a new D-Pin bushing 410 can then be installed in the fashion discussed above with regard to the new D-Pin bushing 314 in FIG. 11.

As illustrated in FIGS. 20-23, the pivot bushing 408 can be replaced in the fashion described with regard to the bushings 204 and 214 in FIGS. 4-7.

While a hydraulic cylinder 132 has been described as being usable to install and remove bearings via the kit 100, the reader should understand that any acceptable actuating device can be used, such as a solenoid, slide hammer, or the like. While several types of vehicle suspensions have been described herein, the reader should understand that the kit 100 according to this disclosure is usable with a wide variety of suspensions, whereby different suspensions can be accommodated by adjusting the clamping nuts 120 to grip the dimensions of the different suspensions. Additionally, while several adapters and alignment members have been described for engaging pivot bearings and D-Pin bearings, the reader should understand that other adapters and alignment members can be used to accommodate other types of bushings.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A tool for servicing a bushing received in a bushing mount, comprising:
   a first plate that defines a first axial hole sized to allow a bushing to pass therethrough;
   a first member that is removably mountable on the first side of the bushing, and that has an outer surface that is complementary with the first axial hole, the outer surface defining a mounting point for the first axial hole of the first plate that is aligned with the bushing when the first member is mounted on the first side of the bushing;
   a second plate that defines a second axial hole sized to allow the bushing to pass therethrough; and
   at least one second member configured to clamp the first plate to the second plate with the bushing mount therebetween such that the second plate is mounted on a second side of the bushing opposite the first side, and such that the second axial hole is aligned with the first axial hole;
   the at least one second member defining a mounting point for a hydraulic cylinder, the mounting point being aligned with the first axial hole, second axial hole, and the bushing.

2. The tool of claim 1, further comprising a third plate that defines a third axial hole, and that is removably mountable on the mounting point of the at least one member such that the third axial hole is aligned with the first axial hole, second axial hole, and the bushing, the third axial hole configured to receive a hydraulic cylinder.

3. The tool of claim 1, further comprising a third member that defines:
   a protrusion that is removably receivable within the bushing; and
   an outer surface;
   wherein the first member further defines a fourth axial hole with an inner surface that is complementary to the outer surface of the third member, such that the third member provides a mounting point for the fourth axial hole of the first member on the first side of the bushing that is aligned with the bushing when the protrusion of the third member is received in the bushing.

4. The tool of claim 3, wherein the protrusion of the third member is further configured to be removably receivable in an operative end of a hydraulic cylinder such that the third member enables the hydraulic cylinder to act on bushings through the third member.

5. The tool of claim 1, wherein:
   each of the first plate and second plate further defines at least one longitudinal hole configured to be aligned with each other when the first plate and second plate are aligned with each other; and
   the at least one second member includes:
   at least one rod that, when passed through the longitudinal holes, aligns the first plate with the second plate; and
   at least one fastener that is configured to be mounted on the at least one rod on a portion facing away from the first plate and the bushing, the fastener being operable to engage the first plate and clamp the second plate to the first plate.

6. The tool of claim 1, further comprising:
   a third member defines a recess configured to receive at least a portion of a bushing such that a face of the third member opposite the recess defines a planar operating face for acting on the bushing.

7. The tool of claim 6, wherein the recess of the third member has a D-shaped profile configured to receive at least a portion of a D-pin bushing.

8. The tool of claim 1, further comprising:
   a fourth member configured to be removably receivable in an operative end of the actuating device such that the fourth member enables the actuating device to act on bushings through the fourth member.

9. The tool of claim 1, further comprising:
   a hydraulic cylinder configured to be mounted onto the aligned mounting point of the at least one second member via a third plate that defines a sixth axial hole, such that the hydraulic cylinder is oriented toward and aligned with the bushing.

10. A tool for servicing a bushing received in a bushing mount, comprising:
    at least one first member having a first portion, a second portion, and a third portion between the first portion and the second portion;
    a first plate that defines a first axial hole and that is mounted on the second portion of the at least one first member;
    a second plate that defines a second axial hole and that is mounted on the first portion of the at least one first member;
    a third plate that defines a third axial hole and that is mounted on the third portion of the at least one first member, the first, second, and third axial holes aligned with each other, and the third axial hole of the third plate defining a mounting point for a hydraulic cylinder that is aligned with the bushing;
    a second member that is removably mountable to the bushing to align the first axial hole of the first plate with the bushing; and
    at least one fastener configured to be mounted on the at least one first member between the third plate and the first plate, the at least one fastener configured to engage the first plate to clamp the first plate to the second plate with the bushing mount therebetween.

11. The tool of claim 10, further comprising:
a third member that removably mountable in the bushing to form a mounting point for the second member that is aligned with the bushing.

12. The tool of claim 11, wherein the third member is further configured to be removably received in an operational end of the hydraulic cylinder so that the actuating device acts through the third member when operating on a bushing.

13. The tool of claim 10, further comprising:
a fourth member that is configured to be positioned between the hydraulic cylinder and the bushing mount during operation of the actuation device, and that is configured to receive at least a portion of the bushing.

14. The tool of claim 10, further comprising:
a fifth member that is configured to be received in an operational end of the hydraulic cylinder so that the actuating device acts through the fifth member when operating on a bushing.

15. The tool of claim 10, further comprising:
a sixth member configured to be at least partially received in the second axial hole of the second plate and facing toward the first plate, the sixth member configured to radially support the bearing as the bearing is removed from the bushing mount.

16. The tool of claim 10, further comprising a hydraulic cylinder configured to be mounted in the third axial hole of the third plate such that an operational end of the hydraulic cylinder is axially aligned with the bushing mount, the hydraulic cylinder operable to remove and install bushings in the bushing mount.

17. The tool of claim 10, further comprising:
at least one nut configured to fasten the at least one first member to the third plate; and
at least one nut configured to fasten the at least one first member to the second plate.

18. The tool of claim 1, further comprising:
a fifth member that defines a fifth axial hole and an annular collar surrounding the fifth axial hole that is configured to be received in the second axial hole of the second plate to mount the fifth member between the second plate and the bushing, the fifth member configured to radially support the bushing as the bushing is removed from the bushing mount.

19. The tool of claim 1, wherein the at least one second member includes:
at least one nut configured to fasten the at least one second member to a third plate with a hydraulic cylinder mounted therein; and
at least one nut configured to fasten the at least one second member to the second plate.

* * * * *

UNITED STATES PATENT AND TRADEMARK OFFICE
CERTIFICATE OF CORRECTION

PATENT NO. : 9,981,368 B2
APPLICATION NO. : 14/879384
DATED : May 29, 2018
INVENTOR(S) : Erol Zeren et al.

Page 1 of 1

It is certified that error appears in the above-identified patent and that said Letters Patent is hereby corrected as shown below:

On the Title Page

Item (73) should read:
Assignees: Bosch Automotive Service Solutions Inc., Warren MI (US); Robert Bosch GmbH, Stuttgart (DE)

Signed and Sealed this
Eleventh Day of December, 2018

Andrei Iancu
*Director of the United States Patent and Trademark Office*